(12) United States Patent
Oku et al.

(10) Patent No.: US 9,932,188 B2
(45) Date of Patent: Apr. 3, 2018

(54) TRANSFER PATH ALTERING DEVICE

(71) Applicant: KAO CORPORATION, Tokyo (JP)

(72) Inventors: Shogo Oku, Utsunomiya (JP); Makoto Kokubo, Yaita (JP)

(73) Assignee: KAO CORPORATION, Tokyo (JP)

( * ) Notice: Subject to any disclaimer, the term of this patent is extended or adjusted under 35 U.S.C. 154(b) by 124 days.

(21) Appl. No.: 14/772,815

(22) PCT Filed: Mar. 6, 2014

(86) PCT No.: PCT/JP2014/055847
§ 371 (c)(1),
(2) Date: Sep. 4, 2015

(87) PCT Pub. No.: WO2014/136904
PCT Pub. Date: Sep. 12, 2014

(65) Prior Publication Data
US 2016/0016748 A1    Jan. 21, 2016

(30) Foreign Application Priority Data

Mar. 8, 2013  (JP) ................................. 2013-047333

(51) Int. Cl.
*B65H 20/24*   (2006.01)
*B65H 23/18*   (2006.01)
*B65H 20/30*   (2006.01)

(52) U.S. Cl.
CPC ............. *B65H 20/24* (2013.01); *B65H 20/30* (2013.01); *B65H 23/18* (2013.01); *B65H 2301/4491* (2013.01); *B65H 2801/57* (2013.01)

(58) Field of Classification Search
CPC ........ B65H 20/06; B65H 20/24; B65H 20/30; B65H 20/32; B65H 23/18
See application file for complete search history.

(56) References Cited

U.S. PATENT DOCUMENTS 5,176,334 A    1/1993  Dreschau et al.
2004/0178296 A1  9/2004  Wild et al.
(Continued)

FOREIGN PATENT DOCUMENTS

CN    101759053 A    6/2010
CN    101811627 A    8/2010
(Continued)

OTHER PUBLICATIONS

Extended European Search Report for European Application No. 14760484,7, dated Oct. 20, 2016.
(Continued)

*Primary Examiner* — Michael C McCullough
(74) *Attorney, Agent, or Firm* — Birch, Stewart, Kolasch & Birch, LLP (57) ABSTRACT

A transportation path changing device (1) of the invention is a transportation path changing device that changes a transportation path of a continuous sheet-like object (3) that is being transported. The device includes: an oscillating section (2) that oscillates in an intersecting direction Y intersecting with a flow direction X of the transported object, and that increases/decreases the length of the transportation path of the transported object (3); a first moving means (6) that is connected to the oscillating section (2), and that moves the oscillating section (2) in the intersecting direction Y; a second moving means (7) that moves a portion or the entirety of the first moving means (6) in the intersecting direction Y; and a control section (9) that controls the first moving means (6) and the second moving means (7).

15 Claims, 6 Drawing Sheets

(56) References Cited

U.S. PATENT DOCUMENTS

2010/0276466 A1* 11/2010 Kameda ................. B65H 20/24
  226/124
2011/0049210 A1   3/2011 Kameda

FOREIGN PATENT DOCUMENTS

| | | |
|---|---|---|
| DE | 1227304 B | 10/1966 |
| DE | 3534846 A1 | 4/1987 |
| EP | 0387238 A2 | 9/1990 |
| EP | 2 756 831 A1 | 7/2014 |
| JP | 8-85658 A | 4/1996 |
| JP | 2004-182472 A | 7/2004 |
| JP | 2004-352386 A | 12/2004 |
| JP | 2007-1703 A | 1/2007 |
| JP | 2009-132473 A | 6/2009 |
| JP | 2009-208953 A | 9/2009 |
| JP | 2012-46334 A | 3/2012 |
| JP | 2013-75153 A | 4/2013 |

OTHER PUBLICATIONS

International Preliminary Report on Patentability and an English translation of the Written Opinion of the International Searching Authority issued in the corresponding International Application No. PCT/JP2014/055847 dated Sep. 17, 2015.
International Searc Report issued in PCT/JP2014/055847, dated Apr. 28, 2014.

* cited by examiner

TRANSFER PATH ALTERING DEVICE

TECHNICAL FIELD

The present invention relates to a transportation path changing device.

BACKGROUND ART

In a conventional technique for manufacturing various products such as disposable diapers, a reduced-speed region where the transportation speed for transporting a transported object—such as a constituent member of the product or an intermediate that is in the course of being manufactured—is partially reduced, or dropped to zero, is provided in midstream of a transportation path for transporting the transported object, and various types of processing are performed to the transported object in the reduced-speed region.

For example, Patent Literature 1 discloses a processing device wherein first and second moving elements that move back and forth while guiding a work are provided on each of the upstream side and the downstream side of a processing section, and the first and second moving elements are interlocked by an interlocking section that seesaws back and forth, and thereby, the work is made to halt intermittently at the processing section.

Unfortunately, in the processing device of Patent Literature 1, in order to achieve the temporarily-halted state while keeping the work transportation speed high, a large load has to be applied to e.g. the servomotor that drives the pass-line rollers etc. for driving the first and second moving elements. This results in an increase in the frequency of failure and necessary maintenance work. On the other hand, in order to prevent large loads from being applied to e.g. the servomotor that drives the first and second moving elements, the work transportation speed needs to be reduced, which will deteriorate processing efficiency and product manufacturing efficiency.

Patent Literature

Patent Literature 1: US 2011/049210 (A1)

SUMMARY OF INVENTION

The present invention relates to the provision of a transportation path changing device and a method for processing transported objects with which the aforementioned drawbacks of conventional art can be overcome.

The present invention relates to a transportation path changing device that changes a transportation path of a continuous sheet-like object that is being transported. The transportation path changing device of the invention includes: an oscillating section that oscillates in an intersecting direction intersecting with a flow direction of the transported object, and that increases/decreases the length of the transportation path of the transported object; a first moving means that is connected to the oscillating section, and that moves the oscillating section in the intersecting direction; a second moving means that moves a portion or the entirety of the first moving means in the intersecting direction; and a control section that controls the first moving means and the second moving means.

The present invention also provides a processing method for performing a predetermined processing to an object that is being transported, the transported object processing method involving: temporarily reducing the transportation speed of the transported object or temporarily stopping the transported object by the aforementioned transportation path changing device; and in this state, performing processing to the transported object.

DESCRIPTION OF EMBODIMENTS

The present invention is described below according to preferred embodiments thereof with reference to the drawings.

Figure 1:
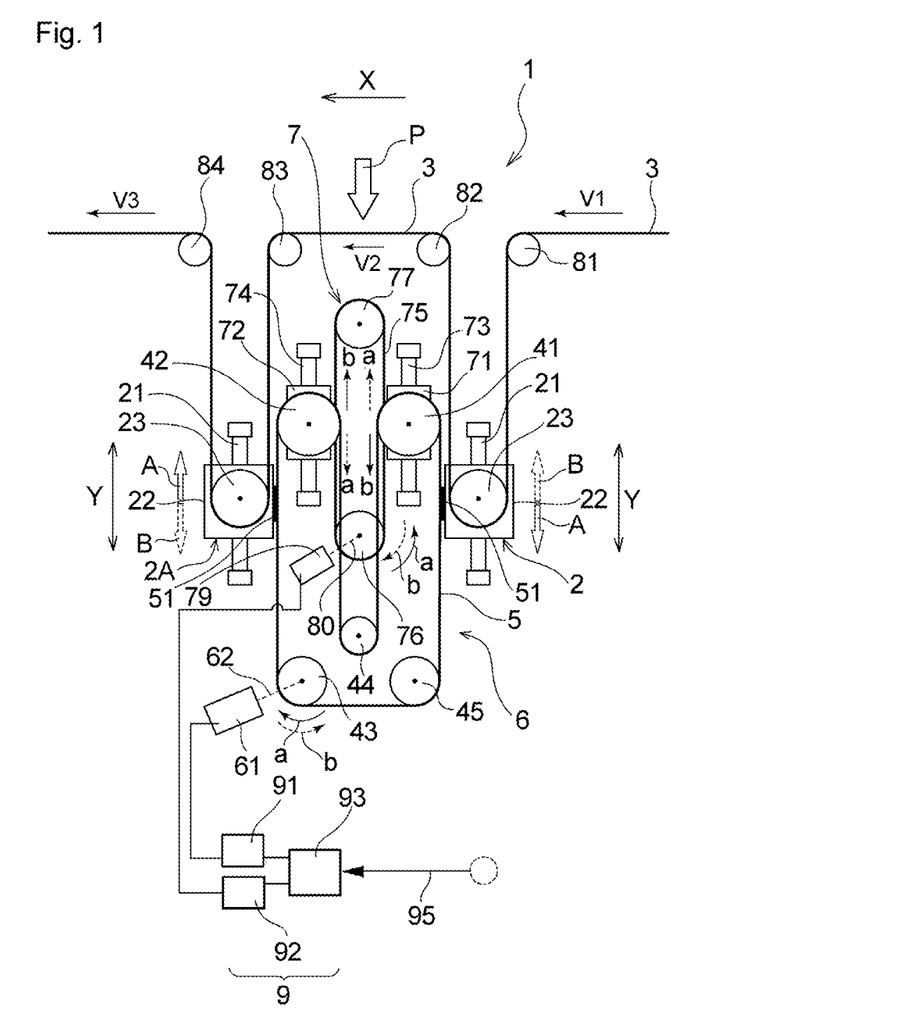
FIG. 1 is a schematic diagram illustrating a transportation path changing device according to a first embodiment of the present invention.

As illustrated in FIG. 1, a transportation path changing device 1 according to a first embodiment of the present invention is a transportation path changing device that temporarily changes the transportation path of a continuous sheet-like object 3 that is being transported, and includes: an oscillating section 2 that oscillates in an intersecting direction Y intersecting with a flow direction X of the transported object 3, and that increases/decreases the length of the transportation path of the transported object; a belt rotating means 6 (first moving means) that is connected to the oscillating section 2, and that moves the oscillating section 2 in the intersecting direction Y; a belt moving means 7 (second moving means) that moves a portion or the entirety of the belt rotating means 6 (first moving means) in the intersecting direction Y; and a control section 9 that controls the belt rotating means 6 (first moving means) and the belt moving means 7 (second moving means).

Figure 3:
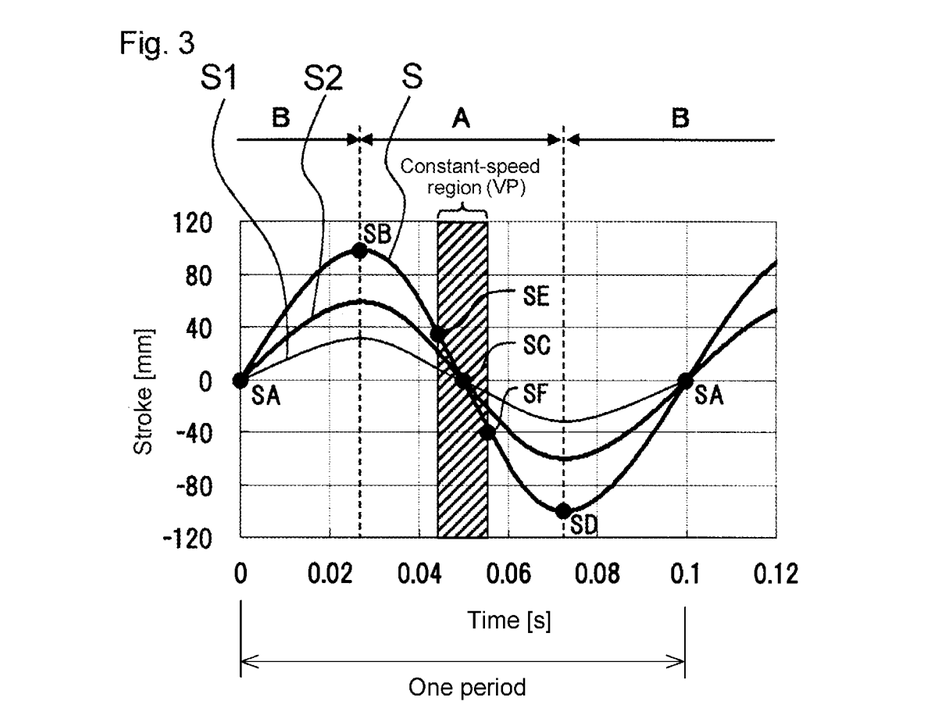
FIG. 3 is a graph illustrating a preferred example of an oscillation pattern of an oscillating section and a method for distributing the movement amount of a first moving means and that of a second moving means.
Figure 4:
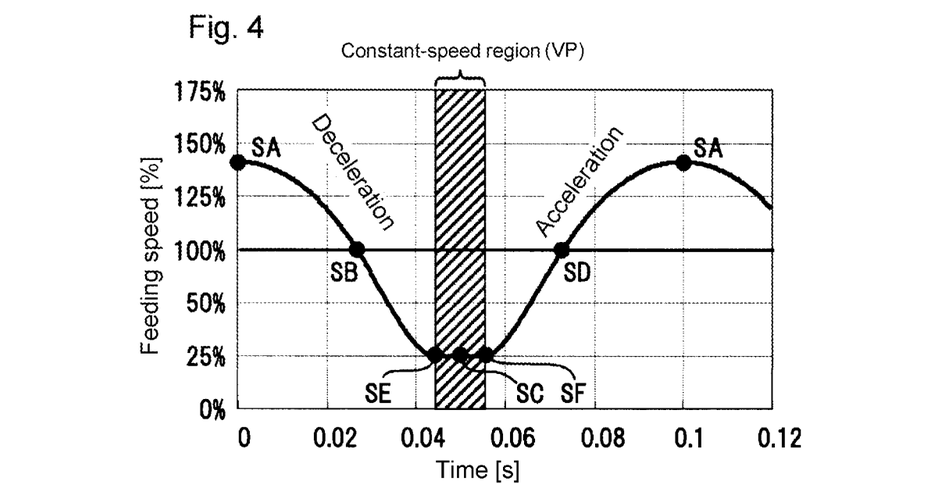
FIG. 4 is a graph illustrating an example of increasing/decreasing the transportation speed at the processing section.

As illustrated in FIG. 1, in the device 1 of the present embodiment, a processing section P that performs processing to the transported object 3 is provided in midstream of the transportation path of the transported object 3, and the device increases/decreases the transportation speed V2 of the transported object 3 at the processing section P according to, for example, a prescribed pattern in which deceleration, constant speed motion, and acceleration are repeated, as illustrated in FIG. 4. More specifically, as illustrated in FIGS. 3 and 4, deceleration is started when the oscillating section 2 reaches a neutral point SA during ascent; then, after the oscillating section 2 passes the top dead center SB, the speed is kept constant in a constant-speed region VP in the vicinity of a neutral point SC during descent; acceleration is started when the oscillating section 2 passes through the constant-speed region VP; and then, after the oscillating section 2 passes the bottom dead center SD, deceleration is started again when the oscillating section 2 reaches the neutral point SA during ascent again.

Further, the device 1 of the present embodiment includes an oscillating section 2 arranged on an upstream side of the processing section P and an oscillating section 2A arranged on a downstream side of the processing section P. The oscillating section 2 arranged on the upstream side and the oscillating section 2A arranged on the downstream side are made to oscillate by the belt rotating means 6 (first moving means) and the belt moving means 7 (second moving means) which are shared by both oscillating sections.

In the device 1 of the present embodiment, both the oscillating sections 2, 2A are made to oscillate by the belt rotating means 6 and the belt moving means 7 which are shared by both oscillating sections.

The belt rotating means 6 includes: an endless first belt 5 that is connected to the oscillating section 2; a plurality of pulleys 41-45 that engage with the first belt 5; and a first servomotor 61 as a drive source that rotates the first belt 5.

More specifically, the first belt 5 is an endless timing belt, and bridges a drive pulley 43, driven pulleys 41, 42 each provided on respective sliders 71, 72, and non-movable driven pulley 44, 45. By rotating and driving the drive pulley 43 by the first servomotor 61, the first belt 5 can be rotated in both forward and reverse directions. The rotation of the first belt 5 occurs even if the drive pulley 43 is rotated in a state where the positions of the sliders 71, 72 are fixed and the positions of all of the pulleys are fixed.

The belt rotating means 6 (first moving means) in the present embodiment includes a known power transmission mechanism 62 constituted, for example, by the first servomotor 61 serving as the drive source, and a combination of gears for transmitting the rotation of the motor 61 to the drive pulley 43.

It is preferable that the belt moving means 7 (second moving means) is capable of moving the respective positions of sections of the first belt 5, where the respective oscillating sections 2, 2A are fixed, in a direction Y intersecting with the flow direction X of the transported object 3. As illustrated in FIG. 1, the belt moving means 7 in the device 1 of the present embodiment includes: the sliders 71, 72 on which the respective driven pulleys 41, 42 are rotatably provided; slide guides 73, 74 that determine the direction in which the respective sliders 71, 72 slide; a second belt 75 that is connected to the sliders 71, 72; and a drive pulley 76 and a driven pulley 77 bridged by the second belt 75. The second belt 75 also functions as a linking means that links the sliders 71, 72 and moves the sliders in cooperation.

In the belt moving means 7, by rotating and driving the drive pulley 76 by a second servomotor 79, the driven pulley 77 rotates by following the drive pulley's rotation, and in association with the rotation of the pulleys 76, 77, the second belt 75 and the sliders 71, 72 connected to the second belt 75 move in the direction a or the direction b, as illustrated in the figure. It is preferable that the second belt 75 is also a timing belt.

The belt moving means 7 includes a known power transmission mechanism 80 constituted, for example, by the second servomotor 79 serving as the drive source, and a combination of gears for transmitting the rotation of the motor 79 to the drive pulley 76.

In the belt moving means 7 (second moving means) of the present embodiment, the sliders 71, 72 are respectively connected to the driven pulleys 41, 42 which constitute a portion of the belt rotating means 6 (first moving means), and the belt moving means 7 moves the position of the driven pulley 41—which constitutes a portion of the belt rotating means 6 (first moving means)—in the intersecting direction Y, and thereby moves the oscillating section 2 in the intersecting direction Y so as to oscillate; likewise, the belt moving means 7 moves the position of the driven pulley 42—which constitutes a portion of the belt rotating means 6 (first moving means)—in the intersecting direction Y, and thereby moves the oscillating section 2A in the intersecting direction Y so as to oscillate.

On the other hand, the belt moving means 7 (second moving means) of the present embodiment does not move the positions of the drive pulley 43, the driven pulleys 44, 45, the first servomotor 61 (drive source), the power transmission mechanism 62, etc., of the belt rotating means 6 (first moving means).

The oscillating sections 2, 2A are fixed to the first belt 5. As illustrated in FIG. 1, each of the oscillating sections 2, 2A is provided with: a slider 22 that moves along a slide guide 21; and a transportation roller 23 that is provided on the slider 22 and that can be driven to rotate. A section of the slider 22 is fixed to the first belt 5. Any discretionary method can be employed for fixing the sliders 22 to the first belt 5, such as fixing by an adhesive, fusion bonding, or a bolt, or fixing by using a dedicated tool. Each slider 22 and the first belt 5 are connected, for example, at the section indicated by reference number 51.

The oscillating section 2 arranged on the upstream side of the processing section P and the oscillating section 2A arranged on the downstream side of the processing section P are fixed to respective sections of the first belt 5 that move in opposite directions from one another. Thus, for example, if one of the oscillating sections 2, 2A moves upward in the vertical direction, then the other moves downward in the vertical direction. Further, although it is preferable that the oscillating sections 2, 2A oscillate in the vertical direction, the oscillating sections 2, 2A may oscillate within a horizontal plane, assuming that the direction parallel to the paper surface of FIG. 1 is the horizontal direction.

The oscillating section 2 in the device 1 of the present embodiment is arranged between a pair of driven rollers 81, 82 arranged in the transportation path of the transported object 3, and the oscillation of the oscillating section 2 increases/decreases the length of the loop-shaped transportation path formed between the pair of driven rollers 81, 82.

While the oscillating section 2 is moving in the direction A in FIG. 1, the length of the loop-shaped transportation path formed by the oscillating section 2 increases; thus, the transportation speed V2 of the transported object 3 at the processing section P becomes slower than the entering-side transportation speed V1 of the transported object 3 when it is introduced into the device 1. On the other hand, while the oscillating section 2 is moving in the direction B in FIG. 1, the length of the loop-shaped transportation path decreases; thus, the transportation speed V2 of the transported object 3 at the processing section P becomes faster than the entering-side transportation speed V1.

Further, the oscillating section 2A in the device 1 of the present embodiment is arranged between a pair of driven rollers 83, 84 arranged in the transportation path of the transported object 3, and the oscillation of the oscillating section 2A increases/decreases the length of the loop-shaped transportation path formed between the pair of driven rollers 83, 84.

While the oscillating section 2A is moving in the direction A in FIG. 1, the length of the loop-shaped transportation path formed by the oscillating section 2A decreases; thus, the exiting-side transportation speed V3 of the transported object 3 when it exits the device 1 becomes faster than the transportation speed V2 of the transported object 3 at the processing section P. On the other hand, while the oscillating section 2A is moving in the direction B in FIG. 1, the length of the loop-shaped transportation path increases; thus, the exiting-side transportation speed V3 of the transported object 3 when it exits the device 1 becomes slower than the transportation speed V2 of the transported object 3 at the processing section P.

Further, in the device 1 of the present embodiment, the oscillating sections 2, 2A move by the rotation and movement of the first belt 5 which is shared therebetween. Thus, when one oscillating section 2 ascends from a predetermined reference position—e.g., a neutral position C (cf. FIG. 2(b)) where the height-wise positions of the oscillating section 2 and the oscillating section 2A match one another—the other oscillating section 2A descends from the same reference position by the same distance at the same speed, and when one oscillating section 2 descends from the neutral position C, the other oscillating section 2A ascends from the same reference position by the same distance at the same speed. Thus, it is possible to keep the entering-side transportation speed V1 and the exiting-side transportation speed V3 of the transported object 3 constant at all times.

The rotation/stoppage, rotation direction, rotation position, speed, etc., of each of the first and second servomotors 61, 79 can be controlled electrically, and by controlling the servomotors by the control section 9, the oscillating sections 2, 2A can be made to oscillate according to a desired pattern on the basis of a reference signal that changes periodically per predetermined length of the transported object 3—e.g., per the length of a single product such as an absorbent article.

More specifically, the control section 9 includes: a servo amplifier 91 that controls the first servomotor 61 for rotating the first belt 5; a servo amplifier 92 that controls the second servomotor 79 for moving the first belt 5; and a computation section 93.

On the basis of a belt rotation pattern and a belt movement pattern set in advance, and a continuously-changing reference signal 95 that is emitted from a rotary encoder provided within the facility—e.g., a rotary encoder connected to e.g. a rotary cutter for cutting the object into single pieces of products—and that is reset every time a single product is manufactured, the computation section 93 outputs operation control signals to each of the servo amplifiers 91, 92 in accordance with the respective patterns. The product is, for example: a laminated sheet obtained by performing seal processing by a sealing device arranged at the processing section P of the present device 1; or an absorbent article (e.g. disposable diaper) that has sealed portions formed by a sealing device arranged at the processing section P of the present device 1, and that has been assembled on a production line.

The belt rotation pattern and the belt movement pattern may be inputted to the computation section 93 by means of a storage medium such as a memory. Alternatively, the belt rotation pattern and the belt movement pattern may each be entered to the computation section 93; or an oscillation pattern of the oscillating section (which is a synthetic pattern of the belt rotation pattern and the belt movement pattern) may be entered, and the computation section may calculate the belt rotation pattern and the belt movement pattern from the oscillation pattern in accordance with a distribution rule that has been entered separately or that has been set in advance. As for the reference signal, a reference signal generated by a controller that controls the facility in which the transportation path changing device 1 is installed may be entered to the computation section 93; or the reference signal may be generated inside the computation section 93. As for the computation section 93, it is possible to use a programmable logic controller (PLC) or a commercially-available personal computer in which various interfaces have been added.

Next, a preferred method for controlling the aforementioned transportation path changing device 1 is described. The following control method concerns a control wherein: the transportation speed V2 at the processing section P is periodically increased/decreased as illustrated in FIG. 4 while keeping the entering-side transportation speed V1 and the exiting-side transportation speed V3 of the transported object 3 constant at all times; and also, a constant-speed region, in which the speed of the transported object passing the processing section P is made constant, is formed in each period.

Figure 2A:
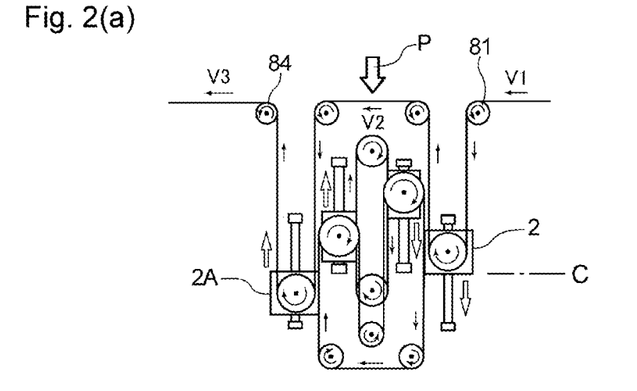
FIG. 2 illustrates diagrams for explaining a method for increasing/decreasing the transportation speed of a transported object at a processing section by using the device of the first embodiment.
Figure 2B:
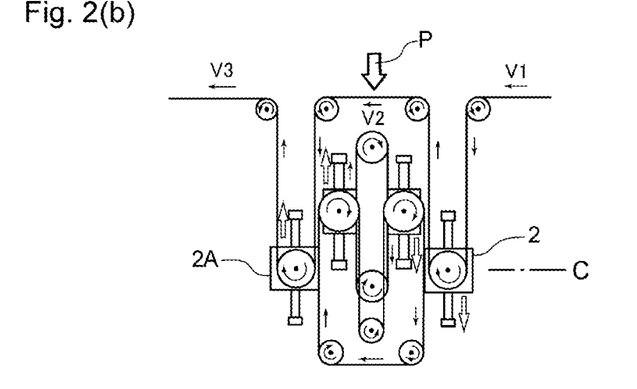

In the preferred control method, the continuous transported object 3 is transported by a feeding means (not illustrated) located upstream of the roller 81 and a feeding means (not illustrated) located downstream of the roller 84 such that the entering-side transportation speed V1 and the exiting-side transportation speed V3 are constant, and in the meantime, the oscillating sections 2, 2A in the device 1 of the present embodiment are made to oscillate such that the oscillation pattern S, which indicates the change in distance from the neutral position C (cf. FIG. 2(b)), follows a sinusoidal curved line as illustrated in FIG. 3. In FIG. 3, the horizontal axis indicates time, and the vertical axis indicates the distance (stroke) of each oscillating section 2, 2A from the neutral position C (cf. FIG. 2(b)). As for the oscillating section 2, a positive value indicates that the oscillating section 2 is located above the neutral position C, whereas for the oscillating section 2A, a positive value indicates that the oscillating section 2A is located below the neutral position C. It should be noted that the segment between points SE-SF in the sinusoidal curved line illustrated in FIG. 3 is a straight line, and the oscillating sections 2, 2A oscillate at a constant speed.

Figure 2C:
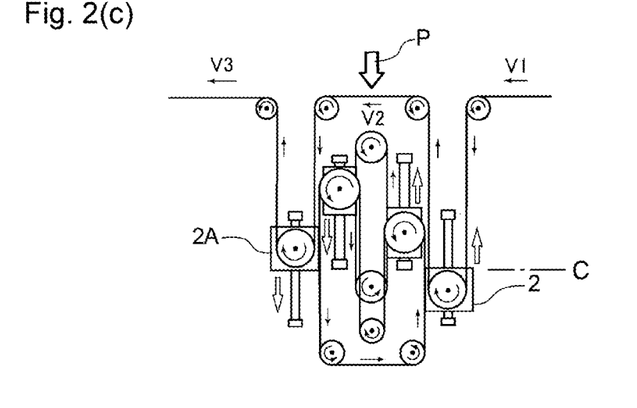

FIG. 2(a) illustrates a state in which the oscillating section 2 is located above the neutral position C and is descending, and corresponds to the segment between points SB-SC in FIG. 3. FIG. 2(b) illustrates a state in which the oscillating section 2 is located at the neutral position C and is descending, and corresponds to point SC in FIG. 3. FIG. 2(c) illustrates a state in which the oscillating section 2 is located below the neutral position C and is ascending, and corresponds to the segment between points SD-SA in FIG. 3. Note that, between points SA-SB of FIG. 3, the oscillating section 2 is in a state where it is located above the neutral position C and is ascending (not illustrated).

The transportation speed V2 of the transported object 3 changes periodically so as to decelerate, maintain constant speed, accelerate, and then decelerate again, in association with the oscillation of the oscillating section 2 following the oscillation pattern S. More specifically, as illustrated in FIG. 4, the transportation speed V2 of the transported object 3 decelerates between points SA-SE, maintains constant speed between points SE-SF, and accelerates between points SF-SA. Also, if the entering-side transportation speed V1 and the exiting-side transportation speed V3 of the transported object 3 are considered as 100% in terms of feeding speed, the oscillation pattern S is set such that the area formed by the sine curve between points SB-SD, with the line indicating "feeding speed 100%" serving as the base, is equivalent to the area formed by the sine curve between points SD-SB, as illustrated in FIG. 4. In this way, the region in which the speed is faster than "feeding speed 100%" is in balance with the region in which the speed is slower than 100%, and it is possible to ensure the constant-speed region VP which is slower than both the entering-side transportation speed V1 and the exiting-side transportation speed V3.

FIG. 3 not only illustrates the oscillation pattern S indicating the change in distance of each oscillating section 2, 2A from the neutral position C, but also illustrates the movement amount S1 of each oscillating section 2, 2A caused by rotating the first belt 5 by the first servomotor 61 and the movement amount S2 of each oscillating section 2, 2A caused by moving the sliders 71, 72 by the second servomotor 79. The distance from the neutral position C of each of the oscillating sections 2, 2A at each point in time is the sum of the movement amount S1 by the first moving means, which is driven by the first servomotor 61, and the movement amount S2 by the second moving means, which is driven by the second servomotor 79.

By causing the oscillating sections 2, 2A to oscillate according to the aforementioned method wherein the distance (stroke) of each oscillating section 2, 2A from the neutral position C (cf. FIG. 2(b)) is determined by the sum of the movement amount S1 caused by the first servomotor 61 and the movement amount S2 caused by the second servomotor 79, the movement amount, speed, acceleration, etc. demanded of the drive source, such as the servomotor, for driving each moving means can be reduced. Thus, according to the device 1 of the present embodiment, the speed and acceleration of the movement of the oscillating sections can be increased while suppressing the load on the drive sources such as the servomotors.

As for how to distribute S1 and S2, the rotation pattern S1 and the movement pattern S2 may each be 50% of the oscillation pattern S; however, the speed and acceleration at which the servomotor can rotate differ depending on the capacity and inertia of the first and second servomotors and the inertia of various components connected to the servomotors, such as the pulleys and guides. Thus, in the present device, the speed of the device can be increased efficiently by changing the balance between the rotation pattern S1 and the movement pattern S2—e.g., by harmonizing the load rates of the respective servomotors. Preferred examples include: distributing 50% of the oscillation pattern S to each of the rotation pattern S1 and the movement pattern S2; or distributing the rotation pattern S1 and the movement pattern S2 such that the load rates of the respective servomotors match one another.

The first moving means and the second moving means may be controlled in a state where the load rate of the drive source of the first moving means substantially matches the load rate of the drive source of the second moving means. In this case, "substantially" means that the difference in load rate between the first moving means and the second moving means is within about +20%.

According to the device 1 of the present embodiment, by controlling the oscillating sections 2, 2A as indicated by the oscillation pattern S illustrated in FIG. 3, the transportation speed V2 at the processing section P can be changed periodically as illustrated in FIG. 4 while keeping the entering-side transportation speed V1 and the exiting-side transportation speed V3 of the transported object 3 constant at all times. In the constant-speed region VP in FIG. 4, the speed V2 of the transported object passing the processing section P is kept constant for a predetermined period of time, and by performing processing at the processing section P during that time, various processing can be performed stably while keeping the transportation speeds V1, V3 upstream and downstream of the device 1 high.

Figure 5A:
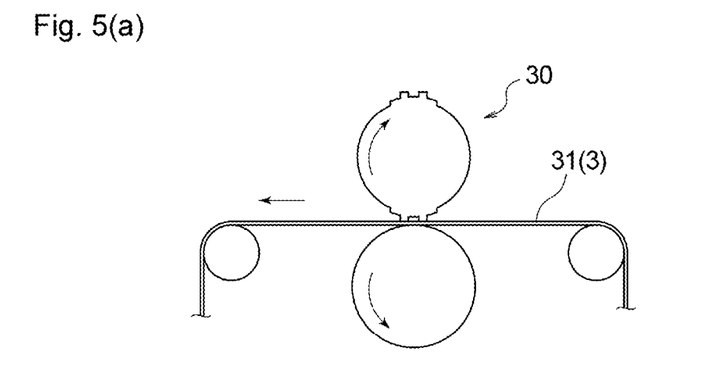
FIG. 5 illustrates diagrams of an example of processing performed in the present invention.
Figure 5B:
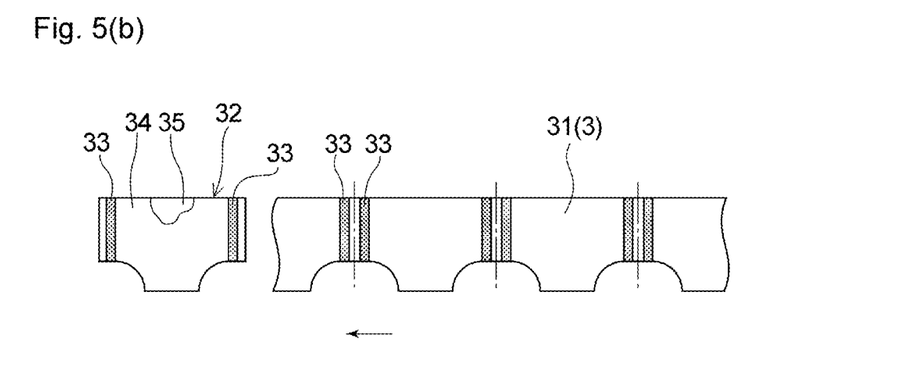

FIG. 5 shows diagrams illustrating an example of processing performed at the processing section P, and illustrates an example in which a heat-sealing device 30 arranged in a production line for manufacturing pull-on disposable diapers is employed for subjecting a continuous diaper strip 31, which is a member before being cut into separate pieces of diapers, to heat-seal processing for forming side seals 33 located on both lateral sides of each diaper 32, which is the final product. The side seals 33 are sealed portions for joining a front body portion 34 and a back body portion 35 at both lateral sides of the diaper 32.

The processing to be performed to the transported object 3 is not particularly limited, and various types of processing can be performed. For example, other sealing processes, such as ultrasonic sealing or high-frequency sealing, may be performed instead of heat-seal processing. Further, cutting, pressing, surface treatment, heat treatment, photocuring, fan-folding, etc., may be performed.

It is preferable that the belt rotating means 6 and the belt moving means 7 are driven by servomotors 61, 79 as in the device 1 of the present embodiment, because the respective positions of the oscillating sections 2, 2A can be controlled with high accuracy.

As in the device 1 of the present embodiment, from the viewpoint of being able to minimize the components that need to be moved in order to move the first belt 5 and being able to further increase the speed and acceleration of the movement of the oscillating sections 2, 2A, it is preferable that the belt moving means 7 (second moving means) includes: a plurality of sliders 71, 72 having respective driven pulleys 41, 42 which engage with the first belt 5; and a drive source (servomotor 79 etc.) for moving the respective positions of the sliders 71, 72.

Figure 6:
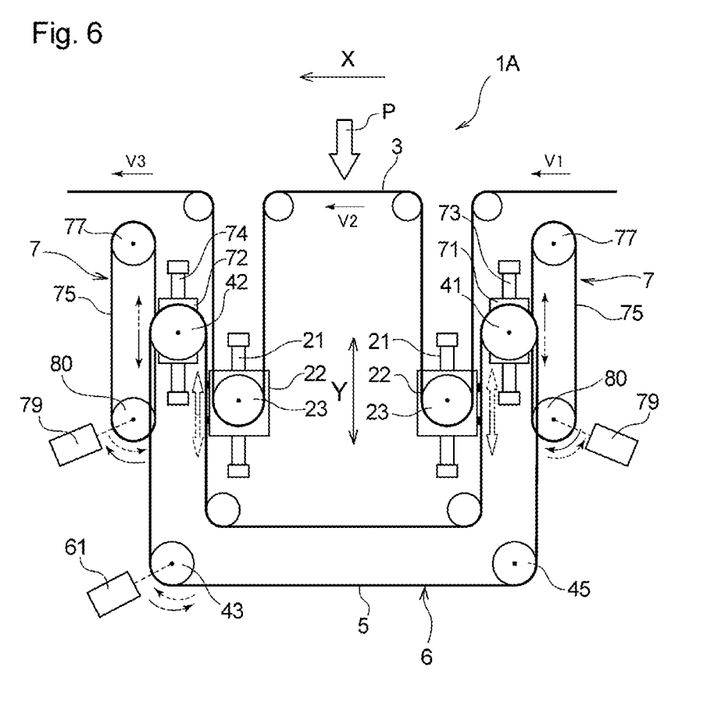
FIG. 6 is a diagram illustrating another embodiment of the present invention.

It should be noted that, as regards the drive source (servomotor 79 etc.) for moving the sliders 71, 72, a single drive source (servomotor etc.) may be provided for a plurality of sliders as in the present embodiment, or a drive source may be provided for each slider 71, 72 as in the second embodiment illustrated in FIG. 6.

Further, the device 1 of the present embodiment is configured such that the second belt 75 connected to the plurality of sliders 71, 72 is driven by the servomotor 79, and thereby both the sliders 71, 72 move in cooperation. By moving the sliders 71, 72 in cooperation, the oscillation of the oscillating sections 2, 2A can be controlled with high accuracy.

Next, other embodiments of the present invention will be described. As for the other embodiments, only features that are different from those of the first embodiment are described, and features that are the same are accompanied by the same reference signs and explanation thereof is omitted. The explanation on the aforementioned first embodiment applies as appropriate to features that are not particularly mentioned.

In a transportation path changing device 1A according to a second embodiment, as illustrated in FIG. 6, the plurality of sliders 71, 72 having the respective driven pulleys 41, 42 are driven by separately-provided second moving means 7, 7. Even with the device 1A of the second embodiment, the same effects as those of the first embodiment are achieved by making the oscillating sections 2, 2A oscillate by the rotation of the first belt 5 by the first moving means and the movement of the first belt 5 by the second moving means.

It is preferable to make the second moving means 7, 7 of the second embodiment move in cooperation by controlling the second moving means 7, 7 with the control section 9.

Figure 7:
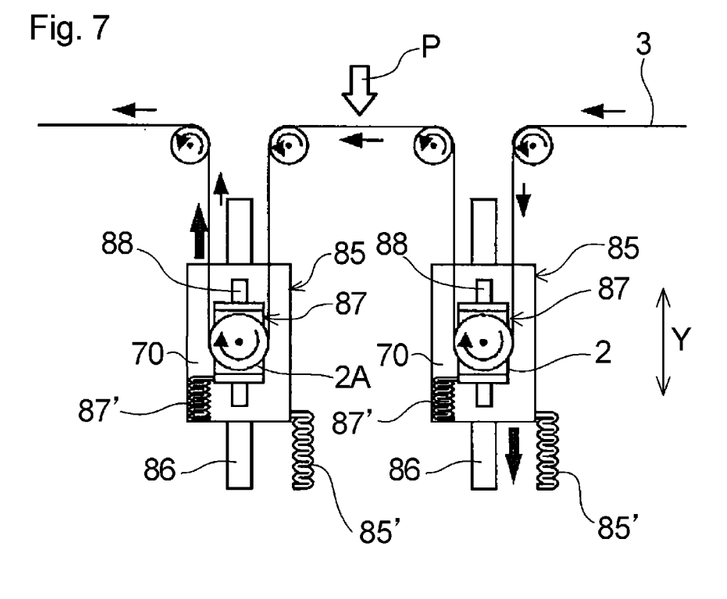
FIG. 7 is a diagram illustrating yet another embodiment of the present invention.

In a transportation path changing device according to a third embodiment, as illustrated in FIG. 7, the oscillating section 2 on the upstream side of the processing section P and the oscillating section 2A on the downstream side are each made to oscillate by the cooperation of a first linear motor 87 and a second linear motor 85. In the third embodiment, the first moving means is constituted by: the first linear motor 87 which makes each oscillating section 2, 2A oscillate on a moving stage 70; and a slide guide 88 that regulates the sliding direction of each oscillating section 2, 2A on the moving stage 70 in the Y direction in the figure. The second moving means is constituted by: the second linear motor 85 that moves the moving stage 70; and a slide guide 86 that regulates the sliding direction of the moving stage 70 in the Y direction in the figure.

In the transportation path changing device of the third embodiment, the reciprocating motion (oscillation) of the oscillating sections 2, 2A is achieved by the cooperation of the first and second linear motors. Thus, the motion speed and acceleration of each motor can be reduced, and the speed can be further increased compared to cases where each oscillating section 2, 2A is moved by a single linear motor. Further, by using a linear motor, the structure of the mechanism can be simplified and the number of components can be reduced, and thus, maintenance work can be reduced.

Figure 8:
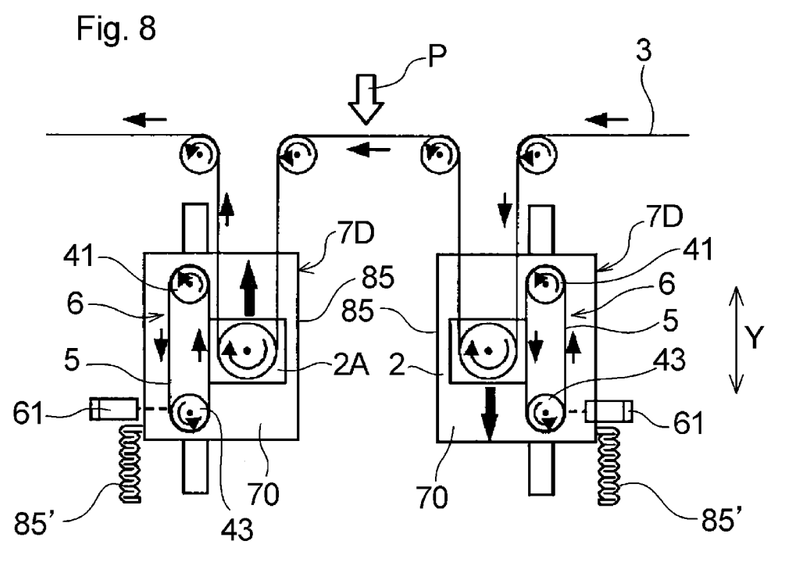
FIG. 8 is a diagram illustrating yet another embodiment of the present invention.

In a transportation path changing device according to a fourth embodiment, as illustrated in FIG. 8, the oscillating section 2 on the upstream side of the processing section P and the oscillating section 2A on the downstream side of the processing section P are each made to oscillate by the cooperation of a belt rotating means 6 (first moving means) and a linear motor 85 (second moving means). More specifically, a plurality of pulleys 41, 43 bridged by the first belt 5 and a servomotor 61 that drives the drive pulley 43, among the pulleys, to rotate the first belt 5 are provided on a moving stage 70 that is moved by the linear motor 85 in an intersecting direction Y intersecting the flow direction of the transported object. The same effects as those of the first embodiment can be achieved by making the oscillating sections 2, 2A oscillate by making the belt rotating means 6 (first moving means), which is driven by the servomotor 61, and a belt moving means 7D (second moving means), which moves the position of the first belt 5 by the linear motor 85, cooperate with one another.

Further, by using a linear motor, the structure of the mechanism can be simplified and the number of components can be reduced, and thus, maintenance work can be reduced.

Note that, as for the linear motor, it is possible to use, for example, a commercially-available linear motor having: a movable element including a coil; and a stator including a magnet. For example, the movable element is provided on the back surface of the moving stage 70, and the stator is arranged on the slide guide opposing the moving stage 70's back surface or on both sides of the slide guide. In FIGS. 7 and 8, reference signs 85' and 87' indicate movable cables for supplying a current to the coil of the linear motor.

The present invention is not limited to the foregoing embodiments, and modifications can be made as appropriate so long as the modifications do not depart from the gist of the invention.

For example, the transported object may be a continuous single-layer or laminated sheet, or may be an object in which other members, such as absorbent members, are arranged intermittently between the sheets. Alternatively, the transported object may be an object in which other members are arranged intermittently on a sheet for transportation.

Further, instead of causing the oscillating sections on each of the upstream side and downstream side of the processing section P to oscillate by making the first moving means and the second moving means work in cooperation, only one of the oscillating sections may be caused to oscillate by the cooperation of the first and second moving means, and the other oscillating section may be caused to oscillate by one of various known methods.

Further, the processing performed at the processing section P may be performed in a state where the speed of the transported object is reduced, or may be performed in a state where the movement of the transported object is completely stopped.

In relation to the foregoing embodiments, the present invention further discloses the following transportation path changing devices and processing methods.

{1}

A transportation path changing device that changes a transportation path of a continuous sheet-like object that is being transported, the transportation path changing device comprising:

an oscillating section that oscillates in an intersecting direction intersecting with a flow direction of the transported object, and that increases/decreases the length of the transportation path of the transported object;

a first moving means that is connected to the oscillating section, and that moves the oscillating section in the intersecting direction;

a second moving means that moves a portion or the entirety of the first moving means in the intersecting direction; and a control section that controls the first moving means and the second moving means.

{2}

The transportation path changing device as set forth in clause {1}, wherein the first moving means includes: an endless belt; a plurality of pulleys that engage with the belt; and at least one drive source that rotates and drives at least one of the pulleys.

{3}

The transportation path changing device as set forth in clause {2}, wherein the belt is an endless timing belt.

{4}

The transportation path changing device as set forth in clause {2} or {3}, wherein the belt bridges a drive pulley, a driven pulley provided on a slider, and a non-movable driven pulley.

{5}

The transportation path changing device as set forth in any one of clauses {2} to {4}, wherein the belt can rotate in both forward and reverse directions.

{6}

The transportation path changing device as set forth in any one of clauses {2} to {5}, wherein the second moving means includes: a plurality of sliders each having the pulley that engages with the belt; and at least one drive source that moves respective positions of the plurality of sliders.

{7}

The transportation path changing device as set forth in clause {6}, wherein:

the second moving means includes a second belt that moves the plurality of sliders; and the second belt functions as a linking means that links the plurality of sliders and moves the sliders in cooperation.

{8}
The transportation path changing device as set forth in clause {7}, wherein the second belt is a timing belt.

{9}
The transportation path changing device as set forth in any one of clauses {1} to {8}, wherein:
the first moving means is a belt rotating means that rotates an endless belt that bridges a plurality of pulleys;
the second moving means is a belt moving means that moves the belt in the intersecting direction which intersects with the flow direction of the transported object; and
the oscillating section oscillates in the intersecting direction in association with the rotation and the movement of the belt.

{10}
The transportation path changing device as set forth in any one of clauses {1} to {9}, wherein the second moving means moves a slider that rotatably supports a driven pulley constituting a portion of the first moving means, and moves the position of the driven pulley in the intersecting direction Y intersecting the flow direction of the transported object, and thereby moves the oscillating section in the intersecting direction Y so as to oscillate.

{11}
The transportation path changing device as set forth in any one of clauses {1} to {10}, wherein the second moving means does not move the positions of the drive pulley, the driven pulleys, the first servomotor (drive source), and the power transmission mechanism of the first moving means.

{12}
The transportation path changing device as set forth in any one of clauses {1} to {11}, wherein the plurality of sliders having the respective driven pulleys are driven by separately-provided second moving means.

{13}
The transportation path changing device as set forth in any one of clauses {1} to {12}, wherein a drive source of the first moving means is a servomotor, and a drive source of the second moving means is a servomotor or a linear motor.

{14}
The transportation path changing device as set forth in any one of clauses {1} to {13}, wherein the first moving means includes a power transmission mechanism constituted by a first servomotor serving as the drive source, and a combination of gears for transmitting the rotation of the motor to the drive pulley.

{15}
The transportation path changing device as set forth in any one of clauses {1} to {13}, wherein a belt moving means serving as the second moving means includes a power transmission mechanism constituted by a second servomotor serving as the drive source, and a combination of gears for transmitting the rotation of the motor to a drive pulley.

{16}
The transportation path changing device as set forth in any one of clauses {1} to {15}, wherein:
a processing section that performs processing to the transported object is provided;
a first oscillating section arranged on an upstream side of the processing section and a second oscillating section arranged on a downstream side of the processing section are provided; and
at least the first oscillating section arranged the upstream side is made to oscillate by the first moving means and the second moving means.

{17}
The transportation path changing device as set forth in clause {16}, wherein the first oscillating section arranged on the upstream side of the processing section and the second oscillating section arranged on the downstream side of the processing section are fixed to respective sections of a belt that move in opposite directions from one another, the belt constituting a portion of the first moving means.

{18}
The transportation path changing device as set forth in clause {16} or {17}, wherein the first oscillating section arranged on the upstream side of the processing section and the second oscillating section arranged on the downstream side of the processing section are fixed to a shared belt constituting a portion of the first moving means.

{19}
The transportation path changing device as set forth in clause {17} or {18}, wherein:
each of the first oscillating section and the second oscillating section is provided with: a slider that moves along a slide guide; and a transportation roller that is provided on the slider and that can be driven to rotate; and
a section of the slider is fixed to a first belt constituting a portion of the first moving means.

{20}
The transportation path changing device as set forth in any one of clauses {16} to {19}, wherein:
the first oscillating section arranged on the upstream side of the processing section is arranged between a pair of driven rollers arranged in the transportation path of the transported object; and
the oscillation of the first oscillating section increases/decreases the length of the loop-shaped transportation path formed between the pair of driven rollers.

{21}
The transportation path changing device as set forth in any one of clauses {16} to {20}, wherein:
the second oscillating section arranged on the downstream side of the processing section is arranged between a pair of driven rollers arranged in the transportation path of the transported object; and
the oscillation of the second oscillating section increases/decreases the length of the loop-shaped transportation path formed between the pair of driven rollers.

{22}
The transportation path changing device as set forth in any one of clauses {16} to {21}, wherein, when the first oscillating section arranged on the upstream side of the processing section ascends from a predetermined reference position, the second oscillating section arranged on the downstream side of the processing section descends from the same reference position by the same distance at the same speed, and
when the first oscillating section arranged on the upstream side of the processing section descends from a predetermined reference position, the second oscillating section arranged on the downstream side of the processing section ascends from the same reference position by the same distance at the same speed.

{23}
The transportation path changing device as set forth in any one of clauses {1} to {22}, wherein the control section controls the first moving means and the second moving means in a state where a load rate of a drive source of the first moving means substantially matches a load rate of a drive source of the second moving means.

{24}
The transportation path changing device as set forth in any one of clauses {16} to {23}, wherein the processing performed to the transported object is heat-seal processing.

{25}
The transportation path changing device as set forth in any one of clauses {16} to {23}, wherein the processing performed to the transported object is seal processing, such as ultrasonic sealing or high-frequency sealing.

{26}
The transportation path changing device as set forth in clause {24} or {25}, wherein the processing section is for seal processing, in which a sealing device (preferably a heat-sealing device) arranged in a production line for manufacturing pull-on disposable diapers subjects a continuous diaper strip, which is a member before being cut into separate pieces of diapers, to seal processing for forming side seals located on both lateral sides of each diaper which is the final product.

{27}
The transportation path changing device as set forth in clause {26}, wherein the side seals are sealed portions for joining a front body portion and a back body portion at both lateral sides of the diaper.

{28}
The transportation path changing device as set forth in any one of clauses {16} to {23}, wherein the processing performed to the transported object is cutting, pressing, surface treatment, heat treatment, photocuring, or fan-folding.

{29}
The transportation path changing device as set forth in any one of clauses {1} to {28}, wherein the oscillating section is made to oscillate by cooperation of linear motor(s).

{30}
The transportation path changing device as set forth in any one of clauses {1} and {16} to {28}, wherein the drive source of the first moving means and the drive source of the second moving means are each a linear motor.

{31}
The transportation path changing device as set forth in any one of clauses {16} to {30}, wherein a distance from a neutral position (C) of each of the oscillating section arranged on the upstream side of the processing section and the oscillating section arranged on the downstream side of the processing section at each point in time is the sum of a movement amount (S1) by the first moving means and a movement amount (S2) by the second moving means.

{32}
A processing method for performing a predetermined processing to an object that is being transported, the method comprising:
temporarily reducing the transportation speed of the transported object or temporarily stopping the transported object by the transportation path changing device as set forth in any one of clauses {1} to {31}; and
in this state, performing the processing to the transported object.

{33}
The transported object processing method as set forth in clause {32}, wherein the transportation speed V2 of the transported object at a processing section, which is a section where the processing is performed to the transported object, is increased/decreased according to a prescribed pattern in which deceleration, constant speed motion, and acceleration are repeated.

{34}
The transported object processing method as set forth in clause {33}, wherein: deceleration is started when the oscillating section reaches a neutral point SA during ascent; then, after the oscillating section passes the top dead center SB, the speed is kept constant in a constant-speed region VP in the vicinity of a neutral point SC during descent; acceleration is started when the oscillating section passes through the constant-speed region VP; and then, after the oscillating section passes the bottom dead center SD, deceleration is started again when the oscillating section reaches the neutral point SA during ascent again.

INDUSTRIAL APPLICABILITY

With the transportation path changing device and method for processing transported objects according to the present invention, the speed and acceleration of the movement of the oscillating section(s) can be increased while suppressing the load on the drive source(s).

The invention claimed is:

1. A transportation path changing device that changes a transportation path of a continuous sheet-like object that is being transported, the transportation path changing device comprising:
an oscillating section that oscillates in an intersecting direction intersecting with a flow direction of the transported object, and that increases/decreases the length of the transportation path of the transported object;
a first moving means that is connected to the oscillating section, and that moves the oscillating section in the intersecting direction, said first moving means comprising an endless belt, a plurality of pulleys that engage with the belt, and at least one drive source that rotates and drives at least one of the pulleys;
a second moving means that moves a portion or the entirety of the first moving means in the intersecting direction, said second moving means comprising a plurality of sliders each having a pulley that engages with the belt, and at least one drive source that moves respective positions of the plurality of sliders; and
a control section that controls the first moving means and the second moving means.

2. The transportation path changing device according to claim 1,
wherein said plurality of pulleys comprises a drive pulley, a driven pulley provided on a slider, and a non-movable driven pulley, and
wherein the belt bridges the drive pulley, the driven pulley provided on a slider, and the non-movable driven pulley.

3. The transportation path changing device according to claim 1, wherein the belt can rotate in both forward and reverse directions.

4. The transportation path changing device according to claim 1, wherein:
the second moving means includes a second belt that moves the plurality of sliders; and
the second belt functions as a linking means that links the plurality of sliders and moves the sliders in cooperation.

5. The transportation path changing device according to claim 1, wherein:
the oscillating section oscillates in the intersecting direction in association with the rotation and the movement of the belt.

6. The transportation path changing device according to claim 1, wherein the second moving means moves at least one of the plurality of sliders that rotatably supports a driven pulley which is one of the plurality of pulleys constituting a portion of the first moving means, and moves the position of the driven pulley in the intersecting direction intersecting the flow direction of the transported object, and thereby moves the oscillating section in the intersecting direction so as to oscillate.

7. The transportation path changing device according to claim 1, wherein a drive source of the first moving means is a servomotor, and a drive source of the second moving means is a servomotor or a linear motor.

8. The transportation path changing device according to claim 1, wherein:
   a processing section that performs processing to the transported object is provided;
   a first oscillating section arranged on an upstream side of the processing section and a second oscillating section arranged on a downstream side of the processing section are provided; and
   at least the first oscillating section arranged the upstream side is made to oscillate by the first moving means and the second moving means.

9. The transportation path changing device according to claim 8, wherein the first oscillating section arranged on the upstream side of the processing section and the second oscillating section arranged on the downstream side of the processing section are fixed to respective sections of the belt.

10. The transportation path changing device according to claim 8, wherein, when the first oscillating section arranged on the upstream side of the processing section ascends from a predetermined reference position, the second oscillating section arranged on the downstream side of the processing section descends from the same reference position by the same distance at the same speed, and
   when the first oscillating section arranged on the upstream side of the processing section descends from a predetermined reference position, the second oscillating section arranged on the downstream side of the processing section ascends from the same reference position by the same distance at the same speed.

11. The transportation path changing device according to claim 8, wherein the processing performed to the transported object is heat-seal processing.

12. The transportation path changing device according to claim 8, wherein a distance from a neutral position C of each of the oscillating section arranged on the upstream side of the processing section and the oscillating section arranged on the downstream side of the processing section at each point in time is the sum of a movement amount S1 by the first moving means and a movement amount S2 by the second moving means.

13. The transportation path changing device according to claim 1, wherein the control section controls the first moving means and the second moving means in a state where a load rate of a drive source of the first moving means substantially matches a load rate of a drive source of the second moving means.

14. A processing method for performing a predetermined processing to an object that is being transported, the method comprising:
   temporarily reducing the transportation speed of the transported object or temporarily stopping the transported object by the transportation path changing device according to claim 1; and
   in this state, performing the processing to the transported object.

15. A transportation path changing device that changes a transportation path of a continuous sheet-like object that is being transported, the transportation path changing device comprising:
   an oscillating section that oscillates in an intersecting direction intersecting with a flow direction of the transported object, and that increases/decreases the length of the transportation path of the transported object;
   a first moving means that is connected to the oscillating section, and that moves the oscillating section in the intersecting direction;
   a second moving means that moves a portion or the entirety of the first moving means in the intersecting direction; and
   a control section that controls the first moving means and the second moving means; and
   wherein:
   the first moving means comprising an endless belt, a plurality of pulleys that engage with the belt, and at least one drive source that rotates and drives at least one of the pulleys;
   the second moving means is a belt moving means that moves the belt in the intersecting direction which intersects with the flow direction of the transported object; and
   the oscillating section oscillates in the intersecting direction in association with the rotation and the movement of the belt.

\* \* \* \* \*